US012520932B2

(12) United States Patent
Rogers

(10) Patent No.: US 12,520,932 B2
(45) Date of Patent: Jan. 13, 2026

(54) COSMETIC APPLICATOR CLEANING APPARATUS

(71) Applicant: Leif Rogers, Beverly Hills, CA (US)

(72) Inventor: Leif Rogers, Beverly Hills, CA (US)

( * ) Notice: Subject to any disclaimer, the term of this patent is extended or adjusted under 35 U.S.C. 154(b) by 126 days.

(21) Appl. No.: 18/528,674

(22) Filed: Dec. 4, 2023

(65) Prior Publication Data

US 2024/0285063 A1 Aug. 29, 2024

Related U.S. Application Data

(60) Provisional application No. 63/429,832, filed on Dec. 2, 2022.

(51) Int. Cl.

| | |
|---|---|
| ***A46B 17/06*** | (2006.01) |
| ***B08B 1/10*** | (2024.01) |
| ***B08B 1/20*** | (2024.01) |
| ***B08B 3/08*** | (2006.01) |
| *A45D 40/26* | (2006.01) |

(52) U.S. Cl.

CPC ................ *A46B 17/06* (2013.01); *B08B 1/10* (2024.01); *B08B 1/20* (2024.01); *B08B 3/08* (2013.01); *A45D 40/265* (2013.01); *A46B 2200/1053* (2013.01)

(58) Field of Classification Search

CPC ........................ A46B 17/06; A46B 2200/1053

See application file for complete search history.

(56) References Cited

U.S. PATENT DOCUMENTS 6,131,230 A * 10/2000 Manabat .............. A46B 13/001 15/88.4
6,676,320 B1 * 1/2004 Wainer ................... A46B 9/021 401/121
2016/0000217 A1 1/2016 Chamberlain
2020/0187624 A1 * 6/2020 Truong ................ A46B 11/002
2022/0265035 A1 * 8/2022 Dutton ................. A45D 34/043

FOREIGN PATENT DOCUMENTS

KR 20170040847 A * 4/2017 ............ A46B 17/06

* cited by examiner

*Primary Examiner* — Spencer E. Bell
(74) *Attorney, Agent, or Firm* — Gary L. Eastman, Esq.; Eastman IP

(57) ABSTRACT

A tool for removing the dried and hardened cosmetic product from cosmetic applicators, such as mascara brushes, includes a chamber that fits a cosmetic applicator brush and allows for a set of vertically-oriented prongs to agitate the cosmetic applicator brush while the brush is submerged in a cleaning solvent. The chamber with its cleaning solvent, cleaning prongs and rough textured inner walls allows for efficient cleaning of the cosmetic applicator brush. This acts as a reviver of the cosmetic applicator brush and increases the number of uses of the cosmetic applicator and the cosmetic product with which it is used.

4 Claims, 6 Drawing Sheets

COSMETIC APPLICATOR CLEANING APPARATUS

RELATED APPLICATION

The present application claims the benefit of priority to United States Provisional Patent Application titled "COSMETIC APPLICATOR CLEANING APPARATUS" filed Dec. 2, 2023, with Ser. No. 63/429,832, fully incorporated herein by this reference.

FIELD OF THE INVENTION

The present invention relates generally to the cleaning and upkeep of cosmetic applicators. The present invention is more particularly directed to cosmetic applicators that have attached brushes. The present invention is particularly, but not exclusively, useful as an alternative cleaning system for use with a cosmetic applicator brush to clean and improve efficiency of the applicator brush.

BACKGROUND OF INVENTION

Cosmetics are products that may be applied to the human body for reasons including: cleansing, coloring, conditioning, beautifying, preserving, protecting, and/or altering the appearance of an individual. This use can be on various parts of the human body not limited to: skin, hair, nails, lips, eyes, or teeth.

Eye makeup is a category of cosmetic that many people use to complete their full makeup. Eye makeup includes mascara, which emphasizes the upper and lower eyelashes. Mascara may enhance the eyelashes through darkening, thickening, lengthening, and defining the eyelashes. Mascara (in liquid form) is applied to an individual's eyelashes with a brush applicator.

Mascara is generally made up of pigments, oils, waxes, and preservatives. Mascara is normally found in one of three product forms, liquid, powder, or cream. The most common form of mascara is the liquid form, which is most commonly liquid in a tube container with a mascara applicator brush.

A mascara applicator brush is pulled out of the tube containing the reservoir of the mascara liquid or, in some variants, dipped into and subsequently pulled out of a separate tube containing the liquid and then applied to an individual's eyelashes. The applicator brush comes into contact with areas near the eyes whenever mascara is being applied.

A common problem with applying mascara is that through extended use, the applicator brush may accrue dry, matted clumps of what used to be liquid state mascara. The mascara is difficult to clean off of an existing applicator brush due to the dried product's physical consistency. This results in a greater chance of the product ending up in sensitive areas of the eye, or product staining clothing and other items that it comes into contact with. The dry matted clumps also increase the chance of being unable to apply mascara to the eyelashes in the intended manner.

After the mascara applicator brush becomes very clumped and matted with the mascara residue, an owner often discards the mascara brush, regardless of whether more liquid product remains. This is because of the increased difficulty in use of the applicator brush. This results in a net loss of mascara by users over the course of time due to the greater surface area of the matted brush requiring a greater amount of product to fully coat the brush. This means that with each subsequent use there must be more product used to fully coat the brush prior to application of the product (mascara).

Various devices have been proposed for cleaning cosmetic brushes. However, the existing devices or proposals are directed toward mascara bottles having structures that remove excess mascara from a mascara applicator, such as a membrane or wiping member at the opening of the mascara bottle. There is still a need for an apparatus that removes clumpy or dry mascara from a mascara applicator brush. In other words, there needs to be an apparatus that completely and thoroughly removes all traces of mascara from a brush.

In view of the above, it would be advantageous to provide an apparatus that can be used to remove the dry matted mascara residue and clean the cosmetic applicator brush for continued use. This would remedy the problem of premature discarding of mascara.

SUMMARY OF THE INVENTION

Disclosed is a cosmetic applicator cleaning apparatus and a solution for removing cosmetic from an applicator brush. The apparatus includes a housing defining an interior cavity area configured to selectively hold the applicator brush, the cleaning prongs and a cleaning solvent.

The housing defines an open end configured to selectively receive a cosmetic applicator brush into the interior area. The cleaning apparatus includes a cleaning assembly that anchors into a channel/groove of the housing, having a plurality of cleaning prongs that extend parallel to the inner wall of the housing and point inwardly towards the center of the inner cavity.

In a preferred embodiment, the prongs of the cleaning assembly are static, finger-like protrusions vertically/longitudinally in multiples of four, submerged in the cleaning solution in the chamber. Preferred embodiments of the prongs are constructed of a wire or polymer material and positioned or anchored within a groove or channel in the inner wall of the housing.

Therefore, a general object of this invention is to provide a cosmetic applicator cleaning apparatus that is configured to received and clean a mascara applicator brush that has been removed from a mascara bottle.

Another object of this invention is to provide a cosmetic applicator cleaning apparatus, as aforesaid in which a cleaning assembly is constructed of a plurality of prongs so as to be inserted and anchored into the interior of the housing.

Still another object of this invention is to provide a cosmetic applicator cleaning apparatus, as aforesaid, having a multitude of cleaning prongs configured to agitate a mascara applicator when inserted into the housing.

Yet another object of this invention is to provide a cosmetic applicator cleaning apparatus that, as mentioned previously, is easy to operate.

The mascara applicator brush is lowered into the cleaning apparatus's cleaning solution where it is fully submerged in the solution and the bristles on the head of the mascara brush is in contact with the abrasive, agitating surface of the cleaning prongs. The mascara brush is subsequently rotated around its axis and the bristles are freed of the dried matted clumps of old mascara through agitation against the prongs while being submerged in the cleaning solution.

After the mascara applicator brush is removed from the apparatus, it will be free of the clumps of dried mascara residue. By removing the dried residue, the applicator brush will regain its reliability and efficiency and the use of the cosmetic product—mascara in the present example—is returned to its original efficacy.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF INVENTION

Figure 1:
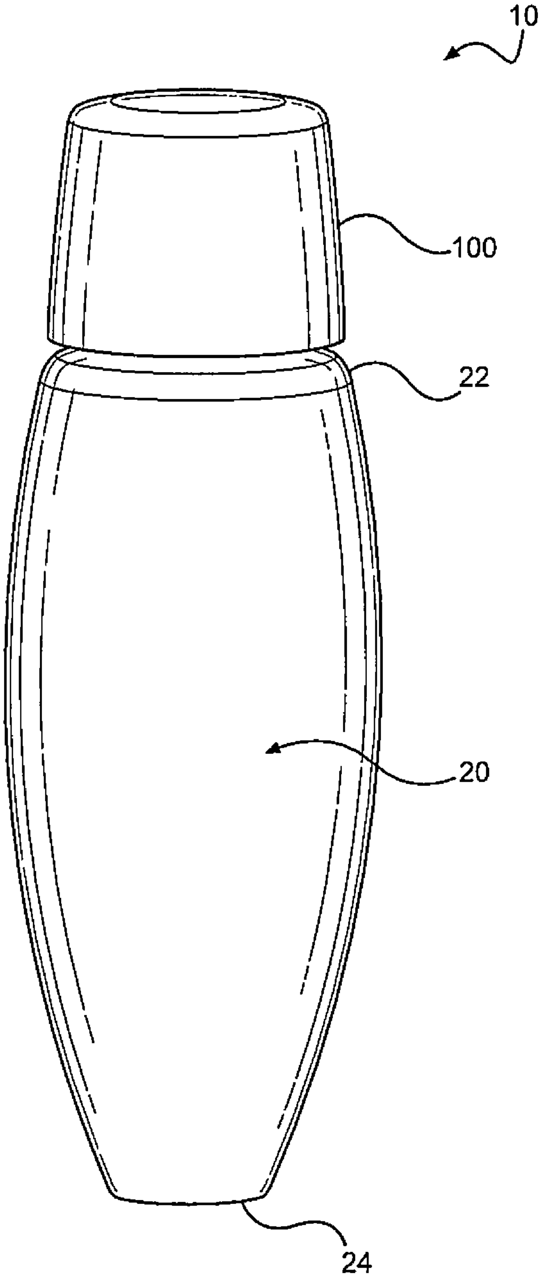
FIG. 1 is a perspective view of a preferred embodiment of the cleaning apparatus.

Referring initially to FIG. 1, a cleaning apparatus is illustrated and generally designated 10. Cleaning apparatus 10 is defined by components such as housing 20 with flat lower end 24 and cap member 100. The flat lower end 24 may have a flat configuration so as to accommodate setting the cleaning apparatus 10 on a flat surface (not shown) such as a tabletop or other sturdy base. Cleaning apparatus 10 contains cleaning prongs 80 (illustrated in FIG. 2*b*) for use in cleaning the cosmetic applicator brush 30 (illustrated in FIG. 3*c*). In a preferred embodiment, the cosmetic applicator brush 30 is a mascara brush 30.

Figure 2A:
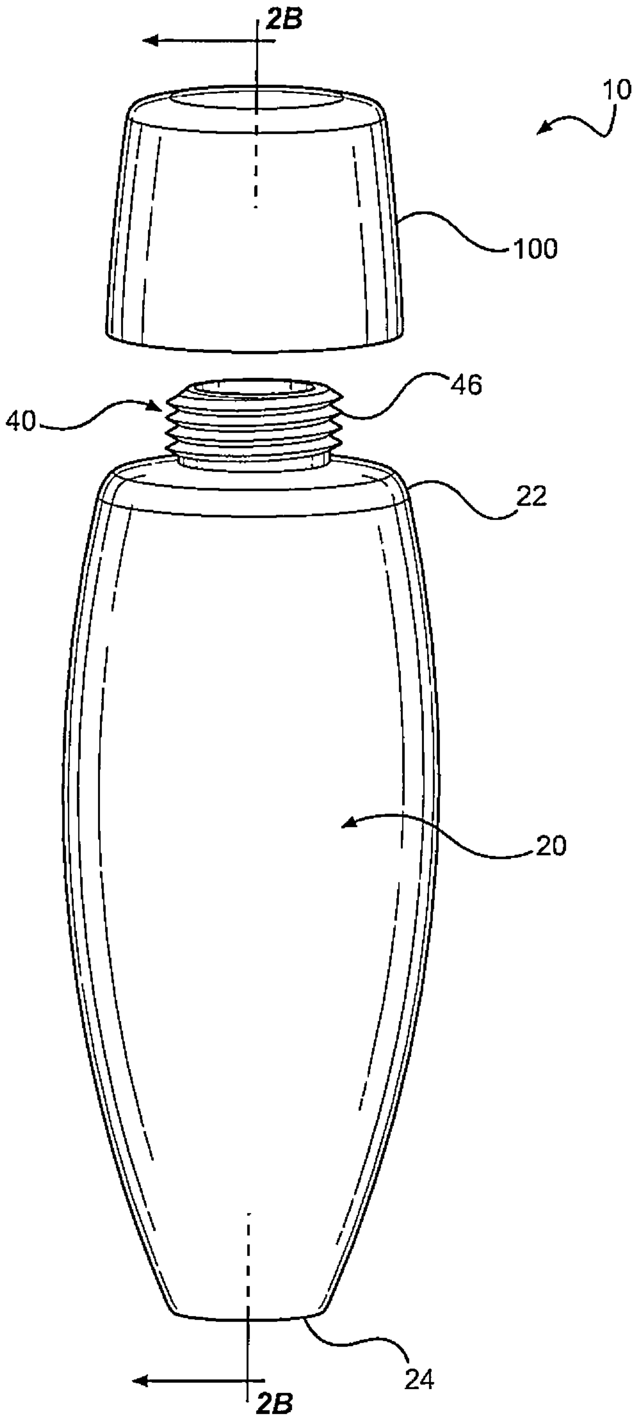
FIG. 2*a* is a perspective view of a preferred embodiment of the cleaning apparatus.

Referring now to FIG. 2*a* a perspective view of the cleaning apparatus 10 is illustrated showing cap member 100 removed. The cleaning apparatus 10 is arranged in a preferred orientation with the flat lower end 24 on a flat surface (not shown). A removable cap member 100 can be taken off to reveal the neck section 40 of the housing 20 with the top end 22 of the housing 20 facing upwards. Exterior threads 46 are present and allow cap member 100 to fasten itself to neck section 40.

Figure 2B:
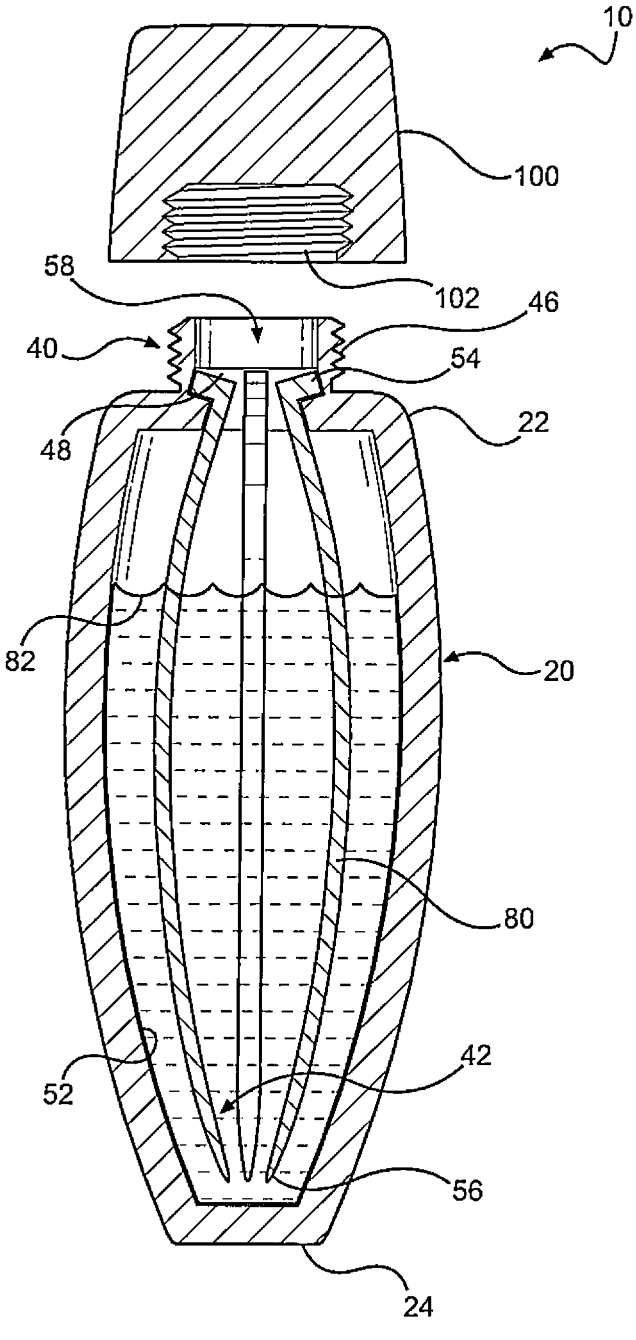
FIG. 2*b* is a side cutaway view of a preferred embodiment of the cleaning apparatus.

Referring now to FIG. 2*b* a sectional view of cleaning apparatus 10 taken along the lines 2*b*-2*b* of FIG. 2*a*. The housing 20 defines a flat lower end 24, an open end 58 and an interior area, or cavity, 42. The prong anchor groove 48 is located within the interior area 42 below the neck section 40 of the housing 20. The interior area 52 is lined with a rough textured inner wall 52 that may assist with the cleaning process.

In some preferred embodiments, the neck section 40 extends upwardly from the top end 22 of the housing 20. The exterior of the neck section 40 may define exterior threads 46. The exterior threads allow for cap member 100 to be threadably fastened to housing 20 using corresponding cap member threads 102.

A set of four (4) evenly-spaced cleaning prongs 80 and a cleaning solvent 82 are located within the interior area 42. Although the illustrated exemplary preferred embodiment has four prongs, embodiments incorporating fewer or additional prongs are fully contemplated herein. The prongs are held static by their upper end anchors 54. The cleaning solvent 82 may be a cosmetic solvent. The open end 58 is configured to selectively receive the cosmetic applicator brush 30 (not shown in this figure) into the interior area 42. The cleaning prongs 80 are configured to selectively hold a cosmetic applicator brush 30.

In preferred embodiments a cosmetic applicator brush 30 is inserted into the cleaning apparatus 10 by holding cosmetic applicator brush 30 by the cosmetic applicator brush cap 32 and pushing the cosmetic applicator brush 30 into open end 58 of the housing 20. This placement results in the cosmetic applicator shaft 34 (not shown in this figure) submerged in the cleaning solvent 82 and the cosmetic applicator bristles 36 (not shown in this figure) in contact with the lower end 56 of prongs 80.

As illustrated, the spacing between prongs 80 in preferred embodiments is narrower at the lower end 56, and increases upward along a portion of the length of prongs 80; in some preferred embodiments it narrows again from the widest spacing about midpoint to the upper end where anchors 54 are located. The use of multiple prongs 80 tapering in both directions from a broader middle point allows for a bristle-free design of apparatus 10 while retaining cleaning effectiveness, meaning that bristles, ribs, or other horizontally-oriented members on the cleansing portion of the apparatus 10 are not necessary for effective cleaning of a cosmetic applicator brush 30.

Figure 3A:
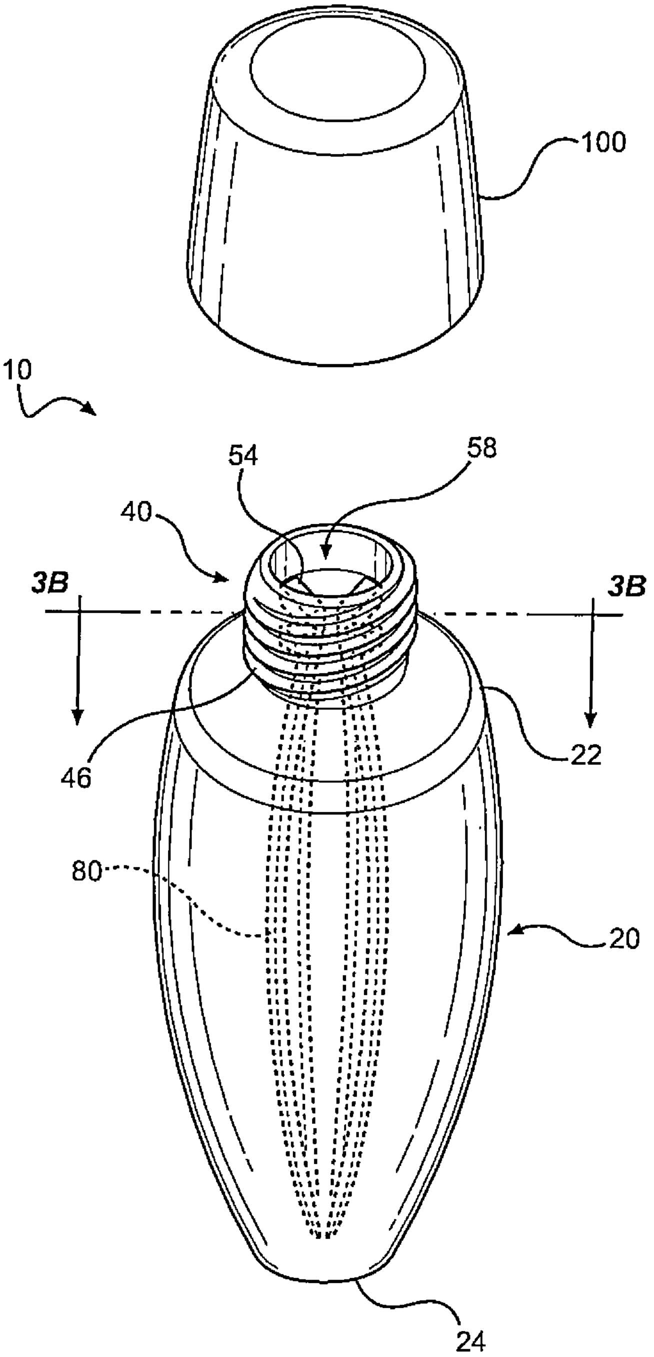
FIG. 3*a* is a perspective view of a preferred embodiment of the cleaning apparatus without the cap member as to have the open end in view.

Referring now to FIG. 3*a* a perspective view of a preferred embodiment of the cleaning apparatus 10 without the cap member 100 attached as to have the neck section 40, exterior threads 46 and open end 58 in view. The housing 20 is arranged in its preferred orientation with the flat lower end 24 facing downwards and the top end 22 facing upwards. The cleaning prongs 80 are seen through the open end 58 of housing 20. The upper end anchors 54 are seen in place within the prong anchor groove 48 through the open end 58 of housing 20.

Figure 3B:
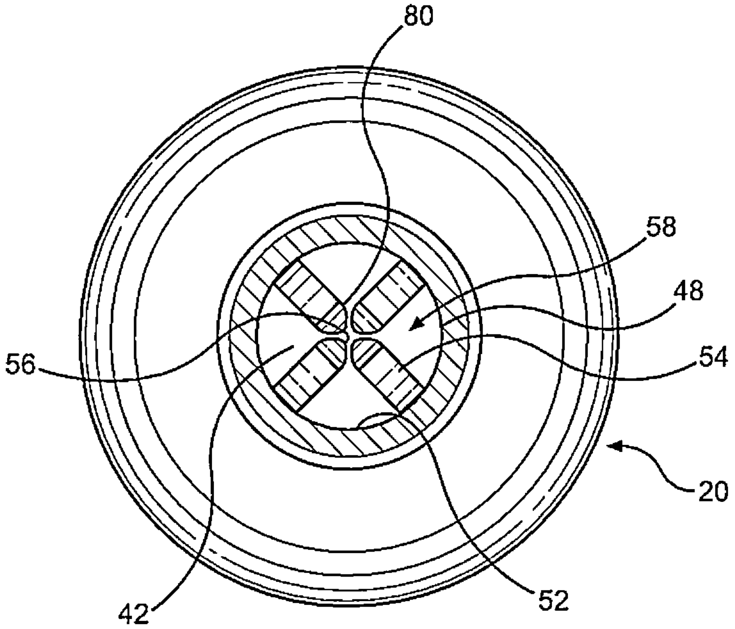
FIG. 3*b* is a top cut away view of a preferred embodiment of the prongs of the cleaning apparatus.

Referring now to FIG. 3*b* a top-down sectional view of a preferred embodiment arrangement of the cleaning prongs 80 of the cleaning apparatus 10 taken along the lines 3*b*-3*b* of FIG. 3*a*. This view shows the interior area 42 through the open end 58. The cleaning prongs 80 are seen within the interior area 42. The prong anchor groove 48 is seen supporting the upper end anchors 54 of the cleaning prongs 80. The lower end of prongs 56 are seen in the middle of interior area 42.

Figure 3C:
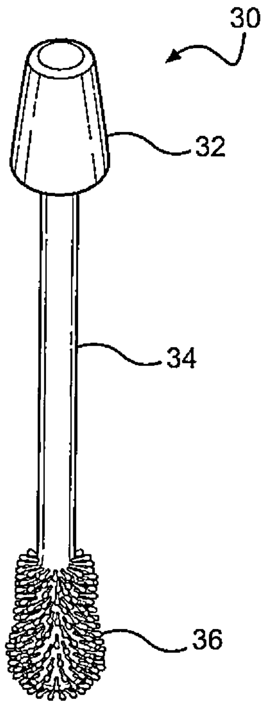
FIG. 3*c* is a perspective view of a typical cosmetic applicator brush in the form of a mascara brush.

Referring now to FIG. 3*c*, a perspective view of a typical cosmetic applicator brush 30 in the form of a mascara brush. Cosmetic applicator brush 30 is defined by components such as cosmetic applicator brush cap 32 that is connected to the base of a cosmetic applicator brush shaft 34 and at the opposite end of the cosmetic applicator brush shaft 34 there are an assortment of applicator brush bristles 36.

Figure 4:
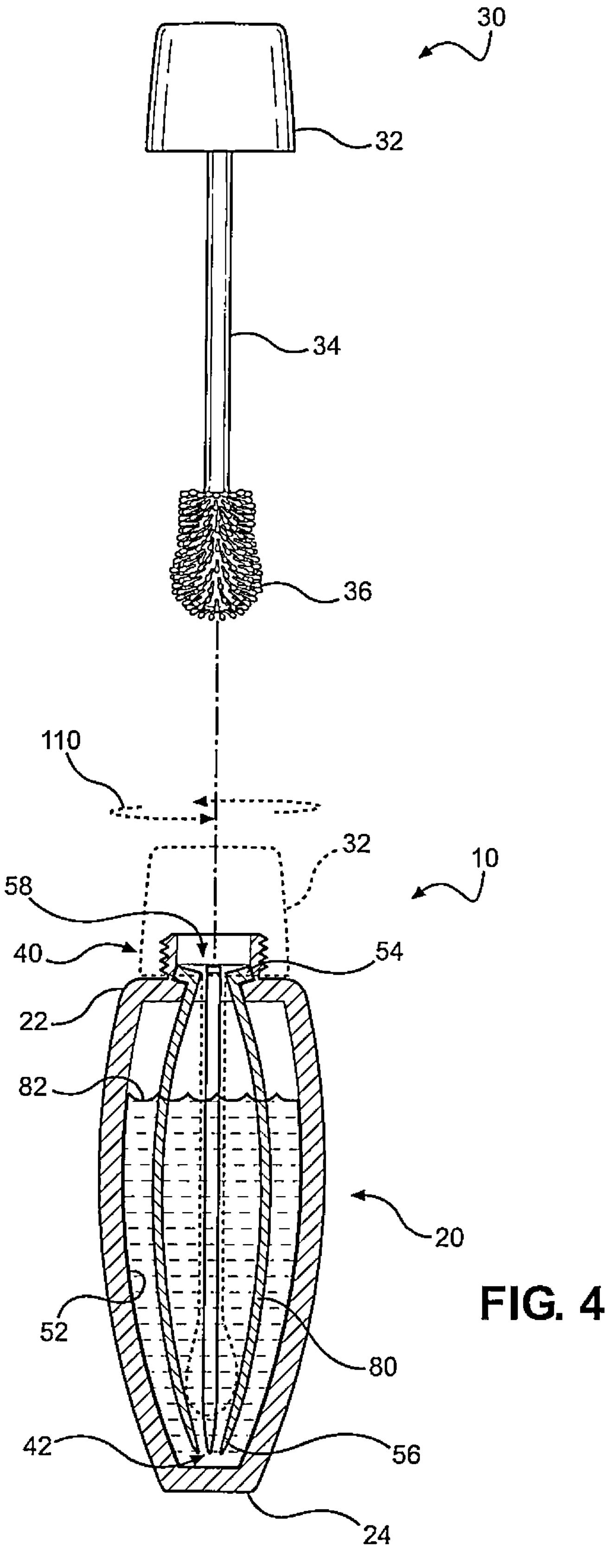
FIG. 4 is a front cut away view of the cleaning apparatus and the mascara applicator brush demonstrating their interaction with each other.

Referring now to FIG. 4 is a perspective view of a typical cosmetic applicator brush 30 above a front sectional view of the cleaning apparatus 10 and the cosmetic applicator brush 30 demonstrating their interaction with each other. The housing 20 is oriented with the flat lower end 24 oriented facing downwards and the top end 22 facing upwards.

The cleaning prongs 80 and a cleaning solvent 82 are located within the interior area 42 and surrounded by a rough textured inner wall 52. The cleaning prongs 80 are held static by their upper end anchors 54. However, cleaning prongs, in a preferred embodiment, are flexible at their lower end distal from said upper end anchors 54 to flex outwards to receive a cosmetic applicator brush 36. Preferred embodiments of the cleaning solvent 82 are water-based antimicrobial solvents; for example, hypochlorous acid water is used in some exemplary preferred embodiments. The open end 58 is configured to selectively receive the cosmetic applicator brush 30 into the interior area 42. The cleaning prongs 80 are configured to selectively hold a cosmetic applicator brush 30.

In the preferred embodiments a cosmetic applicator brush 30 that has dry and hardened cosmetic product adhered to it is inserted into the cleaning apparatus 10 by holding cosmetic applicator brush 30 by the cosmetic applicator brush cap 32 and pushing the cosmetic applicator brush 30 past the neck section 40 into the open end 58 of the housing 20. This placement results in the cosmetic applicator shaft 34 and cosmetic applicator bristles 36 submerged in the cleaning solvent 82 and the cosmetic applicator bristles 36 in contact with the lower end of prongs 56 and may also be in contact with rough textured inner wall 52.

The result of the interaction between the cosmetic applicator brush 30 and the cleaning apparatus 10 is a cosmetic applicator brush 30 without the accrued dried up cosmetic product on the cosmetic applicator shaft 34 and cosmetic applicator bristles 36.

While there have been shown what are presently considered to be preferred embodiments of the present invention, it will be apparent to those skilled in the art that various changes and modifications can be made herein without departing from the scope and spirit of the invention.

I claim:

1. A cosmetic applicator cleaning apparatus, comprising:

a housing having a top end, a lower end and an internal cavity having an inner wall;

said top end formed with an open neck sized to pass a typical mascara brush;

a plurality of cleaning prongs extending from said neck into said internal cavity, wherein each said cleaning prong has a fixed upper end and a flexible lower end;

wherein said plurality of cleaning prongs are formed with upper end cleaning prong anchors, wherein said neck is formed with a circumferential anchor groove, and wherein said cleaning prong anchors are received within said anchor groove to hold said plurality of cleaning prongs in place within said internal cavity; and a removeable cap sized to seal the top end.

2. The cosmetic applicator cleaning apparatus of claim 1, wherein said neck is formed with external threads, and said cap is formed with corresponding internal threads, and wherein said cap can be threadably attached to said neck to seal said internal cavity.

3. The cosmetic applicator cleaning apparatus of claim 1 wherein said inner wall of said internal cavity of said housing is textured.

4. The cosmetic applicator cleaning apparatus of claim 1 wherein said internal cavity is at least partially filled with a cleaning solvent.

* * * * *